United States Patent Office 3,117,892
Patented Jan. 14, 1964

3,117,892
HIGH VISCOSITY STARCHES USING
STANNIC CHLORIDE
Chim Patel, St. Louis, Mo., and Ronald E. Pyle, Granite City, Ill., assignors to Union Starch and Refining Company, Inc., Columbus, Ind., a corporation of Indiana
No Drawing. Filed Apr. 6, 1961, Ser. No. 101,073
5 Claims. (Cl. 127—33)

The present invention relates generally to starch derivatives and more particularly to a novel high viscosity, water soluble starch product and to a novel method for producing it from unmodified starch. Specifically, the present invention pertains to a thick-boiling starch prepared from unmodified starch by reaction with stannic chloride.

An object of the present invention is to provide a modified starch product which gives higher viscosity pastes than unmodified starch when cooked either with water or alkaline solutions.

A second object of this invention is to produce a modified starch product which gelatinizes at a lower temperature than common for the unmodified starch from which it is made.

Another object is to prepare a modified starch product which yields a softer cold paste than that of the unmodified starch.

A further object of this invention is to produce a modified starch product having the above listed properties by a method which does not disrupt the starch granules through gelatinization. In the process of this invention, starch slurries are treated under conditions especially suited to equipment common to the industry.

Prior art has disclosed that starch may be modified by treatment with aluminum chloride. In this instance, modified starch products are formed which yield lower viscosity pastes than obtained from the unmodified starch from which they were prepared. According to the present invention, treatment of starch with stannic chloride produces a modified starch product having quite different properties than the aluminum chloride modified starch. The stannic chloride modified starch of the present invention yields higher paste viscosities than obtained from the unmodified starch.

Briefly, the present invention comprises reacting a relatively small amount of stannic chloride with unmodified starch, as obtained from corn and preferably in the form of a slurry under controlled conditions. Control of the pH, and concentration of stannic chloride are critical whereas control of the temperature and time of reaction and the Baumé of the starch slurry are of minor importance.

In following the teachings of the present invention, a starch slurry, i.e., unmodified corn starch granules and water at a temperature of about 68°–130° F. and with a Baumé of 14 to 21, is acidified or made alkaline to adjust the pH thereof to preferably between 3 to 9. The starting pH of the slurry is usually in the neighborhood of about 3–5 and will depend upon the source of the corn, the time of the year of its harvest and conditions in the plant which produces the starch slurry. Any base or acid may be used which will adjust the pH to the required level such as sodium carbonate, ($Na_2CO_3$), hydrogen chloride (HCl) or the like. It is emphasized that the base or acid is not added for the purpose—"modifying" the starch but in order to adjust the pH of the slurry in preparation for the addition of the reactant.

The amount of stannic chloride added for modification may vary from 0.05% to about 25%, based on dry substance starch. With 0.05% of stannic chloride, a significant increase in viscosity is noted, especially in the maximum alkaline viscosity (MAV). As more stannic chloride is reacted with the starch, the viscosity of the modified starch increases. As already indicated, the reaction can be conducted at a pH level above about 3 and up to about pH 9. Very excellent results are obtained when the pH range is 4–5 and this range is preferred. Since the stannic chloride is acidic in reaction, it may be necessary to add an alkaline-reacting neutralizing agent to maintain a pH greater than 3. Ammonium, alkali metal, and/or alkaline earth metal hydroxides or carbonates may be employed as the neutralizing agent.

The reaction proceeds satisfactorily at temperatures of about 68° F. to about 130° F. and is not extremely sensitive to temperature variation. Starch slurries at about 115° F. as delivered to the drying equipment in starch plants work very satisfactorily in the process.

The reaction time may vary over a wide range. Starch slurries reacted from ¼ to 10 hours or more before being sent to the driers have been found to be satisfactory. Occasionally, it is not possible to dry a reacted starch immediately and the delays of 10 hours or more have not caused any change in the viscosity of the modified starch.

The starch may be treated in the form of a slurry as it comes from the final stage of the wet milling process. The slurry may have almost any density. When slurries of 14 to 21 Baumé have been treated under otherwise similar conditions, the resultant viscosities and other properties of the products are substantially the same.

After treating with the stannic chloride the slurries are filtered, and the starch is dried at about 240° F., for example, to about 10% moisture.

The measurement of the viscosity of hot starch pastes is used in the industry to determine the degree of modification of starch products. Hot paste viscosity is commonly determined by the Scott method and the Corn Industries Viscometer method. Procedures for these methods of analysis are described by R. W. Kerr in his book entitled "Chemistry and Industry of Starch" (Academic Press, Inc. of New York).

In addition to these tests, the maximum alkali viscosity (MAV) has been employed to show the results of the reaction. In this test, 170 grams of starch (as is basis) is mixed with 900 ml. of water at 120° F. and 100 ml. of 32% sodium hydroxide solution. This mixture is placed in a steam-jacketed vessel equipped with a mechanical with a mechanical agitator. Agitation is started and the temperature of the mixture is raised to 165° F. After holding at this temperature for 10 minutes, 900 ml. of tap water at 80° F. is added to the cooked starch paste. The mixture is cooled to 100° F. and the viscosity is measured by means of a Brookfield viscometer.

The following examples further illustrates the process of the invention.

The processes, as described below, are applied to corn starch. However, these processes are also suitable for modifying other starches, such as potato, tapioca, rice, grain, sorghum and wheat starches.

EXAMPLE 1

A corn starch slurry sample of 17° Bé. corrected to 60° F. was separated into two equal parts. The first part was used as a control. To the second part, 0.05%, dry substance basis (D.S.B.), of stannic chloride in an aqueous solution of about 30% concentration was added. The pH was adjusted to 4 and the slurry was held at 100° F. for 3 hours. Thereafter, the slurry was filtered and the starch was dried at 240° F. to a 10% moisture content. The control was subjected to the same treatment, but without the stannic chloride addition. The properties of the modified and control starch are set forth in Table I below.

Table I

| Example | Conc. of stannic chloride, percent | Gel. temp., °C. | Viscosity | | | |
|---|---|---|---|---|---|---|
| | | | Max. Visc., qm./cm. | Visc. @ 30', qm./cm. | A.P.V., qm./cm. | M.A.V., cps. |
| Control | 0 | 86 | 140 | 120 | 1,668 | 1,200 |
| 1 | 0.05 | 85 | 140 | 120 | 1,600 | 2,000 |

Maximum viscosity, viscosity at 30 minutes and aged paste viscosity (A.P.V.) were measured in gram/centimeter with Corn Industries Research Foundation viscometer. Maximum alkaline viscosity (M.A.V.) was measured in centipoises with Brookfield viscometer as described above.

Treatment of starch with 0.05% stannic chloride did not measurably influence the viscosity characteristics of the starch when pasted with water. However, under the alkaline conditions of the M.A.V. test, the viscosity was significantly increased.

EXAMPLES 2–13

The process set forth in Example 1 was repeated with 0.1–25% concentrations of stannic chloride to determine the influence of the concentration of this reactant on the properties of the final product. The properties of the modified starch products (Examples 2–13) and of the unmodified controls for these samples are presented in Table II.

Table II

| Example | Conc. of stannic chloride, percent | Gel. temp., °C. | Viscosity | | | |
|---|---|---|---|---|---|---|
| | | | Max. Visc., qm./cm. | Visc. @ 30', qm./cm. | A.P.V., qm./cm. | M.A.V., cps. |
| Control (2–5) | 0 | 87 | 108 | 65 | 1,320 | 1,000 |
| 2 | 0.1 | 85 | 120 | 90 | 1,160 | 2,500 |
| 3 | 0.2 | 83 | 148 | 100 | 1,160 | 5,400 |
| 4 | 0.3 | 81 | 168 | 130 | 1,160 | 6,200 |
| 5 | 0.4 | 80.5 | 172 | 138 | 1,000 | 6,700 |
| Control (6–10) | 0 | 86 | 135 | 115 | 1,560 | 1,120 |
| 6 | 0.5 | 77 | 183 | 140 | 1,400 | 10,000+ |
| 7 | 1.0 | 73 | 230 | 185 | 1,420 | 10,000+ |
| 8 | 2.0 | 68 | 400 | 200 | 1,040 | 10,000+ |
| 9 | 5.0 | 66 | 430 | 340 | 360 | 10,000+ |
| 10 | 10.0 | 66 | 480 | 380 | 440 | 10,000+ |
| Control (11–13) | 0 | 87 | 205 | 165 | 1,480 | 1,500 |
| 11 | 15.0 | 70 | 720 | 520 | 420 | 10,000+ |
| 12 | 20.0 | 78 | 500 | 410 | 760 | 10,000+ |
| 13 | 25.0 | 79 | 440 | 380 | 730 | 10,000+ |

It will be seen from the above table that the following modifications in viscosity properties have occurred:

(1) The gelatinization temperature was lowered 2–20° C. below that of the control samples. The gelatinization temperature reached a minimum in samples treated with 5–10% stannic chloride.

(2) In all cases the maximum viscosity of the hot pastes was increased, reaching a maximum at the 15% stannic chloride treatment level.

(3) Set back on cooling as measured by the aged paste viscosity, was significantly lowered. Maximum lowering of this property was reached at the 5–10% stannic chloride treatment level.

(4) The maximum alkali viscosity was much higher than the controls at all levels of treatment.

Starches with these higher viscosities are specially useful for adhesives, corrugating, charcoal, coal and ores briquetting, textile finishing such as back sizing, filling certain kind of fabrics in textile, wet end addition in paper manufacturing, acoustical tile manufacturing, etc.

EXAMPLES 14–17

The influence of pH on the process set forth in Example 1 was determined by treating 17° Bé. starch slurries with 0.5% D.S.B. stannic chloride at 100° F. for 3 hours at pH levels of 3–9. The results are set forth in Table III and show that reaction pH has little influence on the nature of the product obtained.

Table III

| Example | Conc. of stannic chloride, percent | pH | Gel. temp., °C. | Viscosity | | | | |
|---|---|---|---|---|---|---|---|---|
| | | | | Max. visc., qm./cm. | Visc. @ 30', qm./cm. | A.P.V., qm./cm. | M.A.V., cps. | Scott |
| Control (14–17) | 0 | | 87 | 135 | 120 | 1,120 | 1,120 | 85 |
| 14 | 0.5 | 3.0 | 81.5 | 193 | 160 | 840 | 10,000+ | 182 |
| 15 | 0.5 | 5.0 | 80.5 | 212 | 160 | 850 | 10,000+ | |
| 16 | 0.5 | 7.0 | 80.5 | 230 | 175 | 860 | 10,000+ | 200 |
| 17 | 0.5 | 9.0 | 81.0 | 203 | 165 | 896 | 10,000+ | |

EXAMPLES 18–22

Examples 18–22 were conducted substantially as Example 1 on a 17 Bé. starch slurry, with 0.5% D.S.B. stannic chloride at a pH of 4 and at various temperatures as indicated in Table IV.

Table IV

| Example | Temp., °F. | Gel. Temp., °C. | Viscosity | | |
|---|---|---|---|---|---|
| | | | Max. Visc., qm./cm. | Visc., @ 30', qm./cm. | A.P.V., qm./cm. |
| Control (18) | | 86 | 132 | 118 | 1,100 |
| 18 | 80 | 76 | 228 | 178 | 850 |
| Control (19–20) | | 86 | 130 | 120 | 1,616 |
| 19 | 100 | 77 | 215 | 165 | 1,400 |
| 20 | 130 | 80 | 170 | 153 | 1,400 |
| Control (21–22) | | 85 | 210 | 180 | 1,600 |
| 21 | 110 | 72 | 324 | 220 | 1,280 |
| 22 | 120 | 76 | 300 | 200 | 1,280 |

The process has also been conducted at various reaction times but no significant differences in results have been noted between about ¼ to over 6 hours of reaction time. Similarly, changing the Bé. of the slurry has been found to have no significant effect on the results.

The following examples illustrate how the process is carried out in pilot plant quantities.

EXAMPLE 23

40 gallons of 16.5° Bé. final corn starch slurry from the wet milling process (containing about 160 lbs. of starch) were reacted with 350 g. of stannic chloride (0.5% D.S.B.) added as a 30% aqueous solution at a pH of 5 and at 110° F. After 1 hour the slurry was filtered and dried. The results are set forth below in Table V.

Table V

| Example | Conc. of stannic chloride, percent | Gel. Temp., °C. | Max. Visc., qm./cm. | Visc., @ 30' qm./cm. | Viscosity | | |
|---|---|---|---|---|---|---|---|
| | | | | | A.P.V., qm./cm | M.A.V., cps | Scott |
| Control (23) | 0 | 87 | 140 | 110 | 1,600 | 1,240 | 82 |
| 23 | 0.5 | 79 | 230 | 175 | 1,320 | 10,000+ | 168 |
| Control (24) | 0 | 85.5 | 150 | 115 | 1,580 | 1,340 | 90 |
| 24 | 0.5 | 78 | 270 | 185 | 1,260 | 10,000+ | 159 |

EXAMPLE 24

40 gallons of 18° Bé. corn starch slurry (containing about 180 lbs. of starch) were reacted with 350 g. of stannic chloride as in Example 23. A first portion of the run was filtered and dried after 1 hour and a second portion was held for 8 hours prior to filtering. There was no significant difference between the two portions. The properties of the product are shown in Table V.

The features and principles underlying the invention described above in connection with specific exemplifications will suggest to those skilled in the art many other modifications thereof. It is accordingly desired that the appended claims shall not be limited to any specific feature or details thereof.

We claim:

1. The process for producing a modified starch product, which yields a higher than normal cooked paste viscosity, comprising reacting unmodified starch with 0.05 to 25% stannic chloride at a pH range of about 3 to about 9.

2. The process as claimed in claim 1 wherein the reaction is carried out at a temperature at about 68°–130° F.

3. The process as claimed in claim 1 wherein said starch is in aqueous slurry and is treated under non-gelatinizing and non-swelling conditions.

4. The process as claimed in claim 3 comprising filtering and drying the modified starch.

5. A stannic chloride modified starch having increased paste viscosity, lower gelling temperature, and softer cold paste properties than the unmodified starch from which it is prepared by reaction with 0.05 to 25% of stannic chloride.

References Cited in the file of this patent

UNITED STATES PATENTS

| | | |
|---|---|---|
| 1,984,246 | Beyer | Dec. 11, 1934 |
| 2,328,537 | Felton et al. | Sept. 7, 1943 |
| 2,468,207 | Kerr | Apr. 26, 1949 |